(12) United States Patent
Thumpudi et al.

(10) Patent No.: US 11,094,030 B2
(45) Date of Patent: Aug. 17, 2021

(54) METHODS OF TRANSFORMING IMAGE MISALIGNMENT

(71) Applicant: Microsoft Technology Licensing, LLC, Redmond, WA (US)

(72) Inventors: Naveen Thumpudi, Redmond, WA (US); Sang Kun Choe, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/230,296

(22) Filed: Dec. 21, 2018

(65) Prior Publication Data

US 2020/0202478 A1 Jun. 25, 2020

(51) Int. Cl.
*G06T 7/30* (2017.01)
*G06T 1/20* (2006.01)

(52) U.S. Cl.
CPC .............. *G06T 1/20* (2013.01); *G06T 7/30* (2017.01); *G06T 2207/20104* (2013.01)

(58) Field of Classification Search
CPC .... G06T 1/20; G06T 7/30; G06T 2207/20104
USPC ................................................ 345/619, 649
See application file for complete search history.

(56) References Cited

U.S. PATENT DOCUMENTS

| | | | |
|---|---|---|---|
| 2005/0285973 A1 | 12/2005 | Singh et al. | |
| 2006/0017815 A1 | 1/2006 | Stavely et al. | |
| 2008/0008392 A1 | 1/2008 | Goel et al. | |
| 2009/0141045 A1* | 6/2009 | Jackson | G09G 5/391 345/649 |
| 2010/0060792 A1* | 3/2010 | Corlett | H04N 19/44 348/583 |
| 2010/0328689 A1* | 12/2010 | Koo | G06F 13/102 358/1.9 |
| 2011/0032368 A1 | 2/2011 | Pelling | |
| 2012/0140092 A1* | 6/2012 | Nourbakhsh | H04N 1/3877 348/231.99 |
| 2012/0162524 A1* | 6/2012 | Bar-Shalom | G06T 3/60 348/583 |
| 2014/0344480 A1* | 11/2014 | Borve | G06F 9/4411 710/8 |
| 2015/0035991 A1 | 2/2015 | Sachs et al. | |

(Continued)

OTHER PUBLICATIONS

"Control the Camera", Retrieved From: https://web.archive.org/web/20180903050831/https:/developer.android.com/training/camera/cameradirect, Sep. 3, 2018, 8 Pages.

(Continued)

*Primary Examiner* — Jacinta M Crawford
(74) *Attorney, Agent, or Firm* — Ray Quinney & Nebeker P.C.; Paul N. Taylor

(57) ABSTRACT

An image sensor is misaligned with an operating orientation. Misalignment information may be registered with an operating system. Misaligned image data may be transformed as a final processing act before being delivered to an application. A method of transforming image misalignment. Image data having a first orientation is received from an image sensor at a first computing component of a computing device. The image data is transformed using misalignment information to transformed image data having a second orientation. Immediately after transforming the image data, the transformed image data is communicated from a final computing component to an application.

21 Claims, 18 Drawing Sheets

(56) References Cited

U.S. PATENT DOCUMENTS

2016/0113517 A1* 4/2016 Lee ................. G01J 5/0859
            600/474
2016/0210135 A1* 7/2016 Wroblewski ............ H04W 4/70

OTHER PUBLICATIONS

Bazan, et al., "Identifying the Location of Internal Cameras (UWP Device Apps)", Retrieved From: https://docs.microsoft.com/en-us/windows-hardware/drivers/devapps/identifying-the-location-of-internal-cameras, Apr. 20, 2017, 8 Pages.

Kaur, et al., "Exposing the Android Camera Stack", Retrieved From: https://www.embedded-vision.com/academy/Exposing_the_Android_Camera_Stack.pdf, Aug. 28, 2012.

Zhang, Zhengyou, "Flexible Camera Calibration by Viewing a Plane From Unknown Orientations", In Proceedings of Seventh IEEE International Conference on Computer Vision, Sep. 20, 1999, pp. 666-671.

"International Search Report Issued in PCT Application No. PCT/US19/066107", dated Feb. 21, 2020, 11 Pages.

* cited by examiner

METHODS OF TRANSFORMING IMAGE MISALIGNMENT

CROSS-REFERENCE TO RELATED APPLICATIONS

N/A.

BACKGROUND

Background and Relevant Art

Technological advances and consumer demand have reduced the size of electronic devices. As the size of electronic devices shrinks, components of electronic devices are placed in different locations. Due to size constraints caused by the reduction in device size, some components, such as image sensors, are misaligned with an operating orientation of the electronic device. The image data sent by the image sensors is similarly misaligned, and therefore must be transformed prior to a user's interaction with it.

BRIEF SUMMARY

In some implementations, a method for transforming misalignment data from an image sensor in a computer device includes registering misalignment information of the image data from an image sensor in an operating system of a computing device.

In other implementations, a method for transforming image misalignment includes receiving image data in a first orientation from an image sensor. The image data may then be transformed using misalignment information to transformed image data having a second orientation. The transformed image data may then immediately be communicated from a final computing component to an application.

In still other implementations, a method for transforming misalignment of data includes receiving image data from an image sensor. After the image data is received, and before any other processing of the image data, transforming the image data using misalignment information stored in the operating system. The method may further include receiving a request from the application to modify a region of interest of the transformed image data. Immediately after receiving the request, the region of interest may be transformed back to the original orientation. The region of interest may then be modified according to the request.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of implementations of the disclosure will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 12-1 is a representation of an image data pipeline, according to at least one implementation of the present disclosure;

FIG. 12-2 is a representation of a command and control loop including the image data pipeline of FIG. 12-1, according to at least one implementation of the present disclosure;

DETAILED DESCRIPTION

This disclosure generally relates to methods of transforming image misalignment. Technological advances and consumer demand put increasing pressure on the manufacturers of computing devices to develop smaller devices and components. As device housings become smaller, manufacturers must place computer components, such as sensors, in locations having available space. In some cases, the available space may be such that a sensor has an orientation that is misaligned with an operating orientation (e.g., native) of the computing device. In such a configuration, the computing device must transform the misaligned sensor data to align with the operating orientation.

Figure 1:
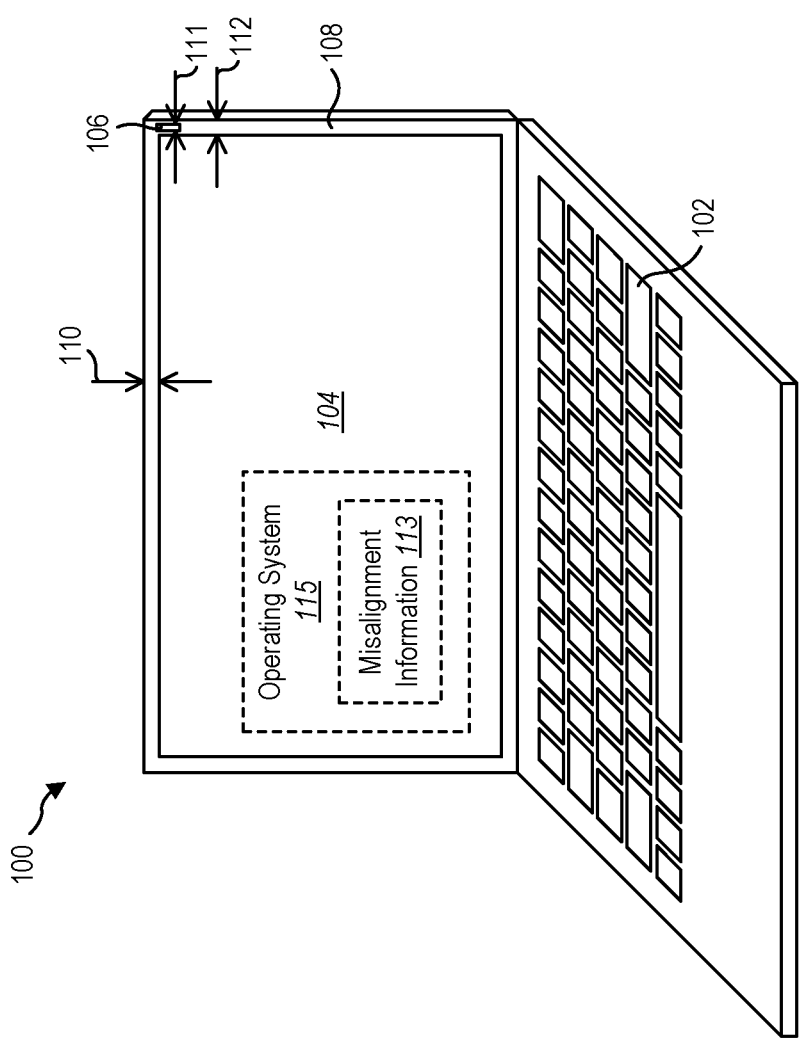
FIG. 1 is a representation of a computing device, according to at least one implementation of the present disclosure.

Referring now to the figures, FIG. 1 is a representation of a computing system 100. The computing system 100 may include an input mechanism 102, such as a keyboard or a touch-pad. The computing system 100 may include a display 104. In some implementations, the display 104 is a touch-screen display, making the display 104 an input mechanism 102. In some implementations, the computing system 100 is a laptop computer. In other implementations, the computing system 100 is a smart device, such as a tablet or a smart phone. In still other implementations, the computing system 100 is a smart watch, a head mounted display, or a monitor. In yet other implementations, the computing system 100 is any computing device or computing device accessory.

The input mechanism 102 may include an image sensor 106. The image sensor 106 may be directional, meaning that the collected image data is oriented based on an orientation, or alignment, of the image sensor 106. Manufacturers of computing systems 100 conventionally align the image sensor 106 with an operating orientation (e.g., native orientation) of the computing device. Thus, as computing devices and components become smaller, the image sensor 106 may be misaligned with the operating orientation.

For example, the image sensor 106 may be located on or near the display 104, such as in a bezel 108 of the display 104. As discussed above, as computing system 100 sizes decrease and/or as consumers demand larger displays 104, manufacturers may reduce the size of the bezel 108. The upper width 110 of the bezel 108 in the upper portion of the display 104 may be reduced to an extent that an image sensor width 111 is greater than the upper width 110. In other words, the image sensor 106 may not fit in the upper portion of the bezel 108. Therefore, the image sensor 106 may be relocated to a side of the display 104, where the bezel 108 has a side width 112 that is equal to or greater than the image sensor width 111. However, this may cause the image sensor 106 to be misaligned with respect to the operating orientation of the image sensor 106. Therefore, image data collected by the image sensor 106 may also be misaligned with respect to the operating orientation. Accordingly, the misalignment of the image sensor 106 may need to be corrected (e.g., transformed) before image data is presented to a user. This may be accomplished by registering misalignment information 113 in an operating system 115 of the computing system 100. Alternatively or additionally, the operating system 115 may be informed of the misalignment information 113.

Figure 2:
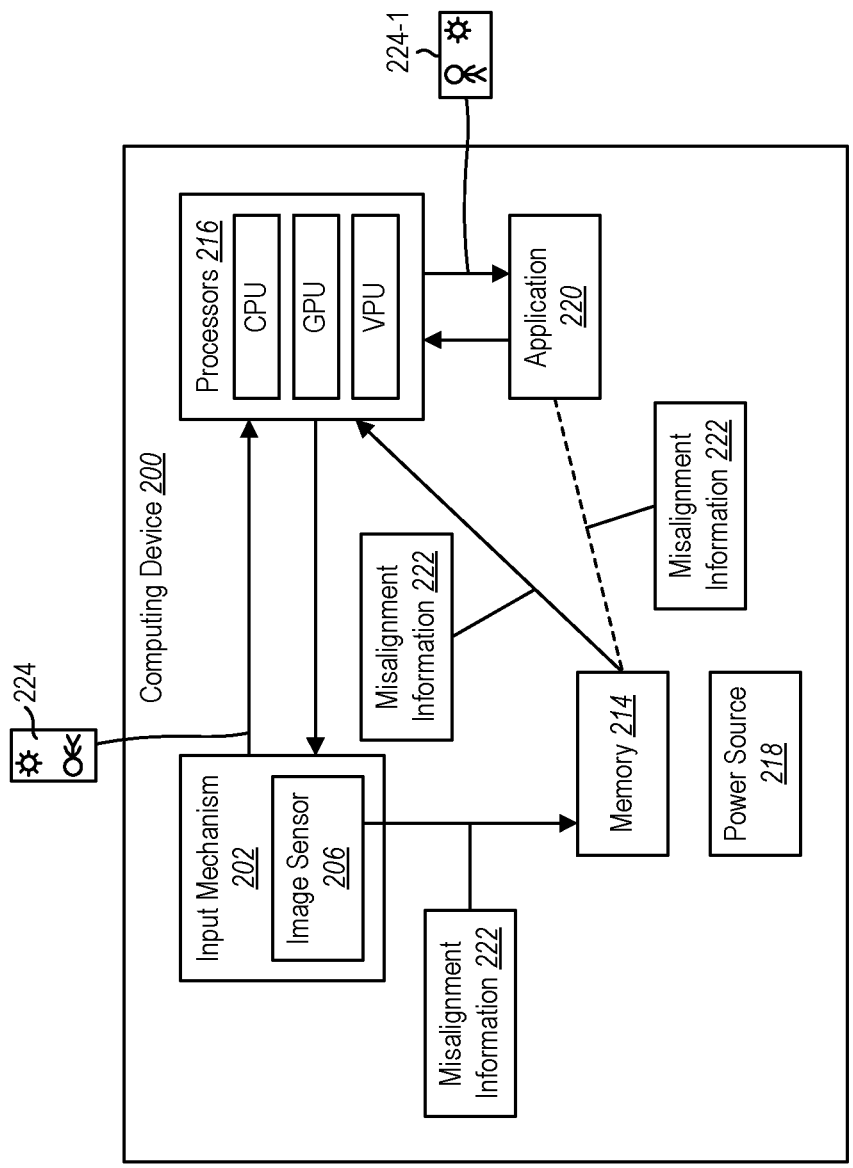
FIG. 2 is a block representation of a computing device, according to at least one implementation of the present disclosure.

FIG. 2 is a representation of the hardware of a computing device 200. The computing device 200 may include a memory 214. An operating system may manage the one or more computing components, such as the processors 216. In some implementations, the operating system is a MICROSOFT WINDOWS operating system. In some implementations, the operating system is a mobile operating system. In still other implementations, the operating system is any operating system that can process image data from an image sensor 206 and provide image data to a user. An input mechanism 202, which may include an image sensor 206, may be in communication with the memory 214 and the one or more processors 216. A power source 218 may provide power to the input mechanism 202, the image sensor 206, the memory 214, the one or more processors 216, other components of the computing device, or any combination of the foregoing. The memory 214 may include programmable instructions executable by the one or more processors 216. For example, the programmable instructions may include an operating system and/or application 220.

The image sensor 206 may include an image driver that captures image data 224. The image sensor 206 or the image driver may provide misalignment information 222 that is stored (e.g., registered) in the operating system. The misalignment information 222 may include a misalignment status, indicating whether the image sensor 206 is aligned or misaligned with an operating orientation of the computing device 200. In other words, the misalignment status may indicate if the operating system must transform the image data 224. For example, the operating system may use the misalignment status when transforming the image data 224.

The misalignment information 222 may indicate a misalignment direction. For example, the misalignment direction indicates that the image sensor 206 is rotated clockwise (e.g., in a positive direction) or counter-clockwise (e.g., in a negative direction) with respect to the operating orientation. Alternatively or additionally, the misalignment direction may indicate in what direction the operating system must transform the image data 224 during transformation of the image data 224. The operating system may use the misalignment direction to transform the image data 224 to align with the operating orientation.

In some implementations, the misalignment information 222 may include a misalignment rotation amount, which is the amount that the image data 224 is rotated. For example, if the image sensor 206 is rotated 90° clockwise (e.g., positive rotation) from the operating orientation, then the image data 224 collected from the image sensor 206 would need to be rotated by 90° to align with the intended operating orientation. Therefore, the misalignment rotation amount would be 90°. Put differently, the misalignment rotation amount indicates the amount by which the operating system should rotationally transform the image data 224 during transformation of the image data 224. For example, the operating system may use the misalignment rotation amount to transform the image data 224 to align with the operating orientation.

In some implementations, the misalignment information 222 may include one or more of misalignment status, misalignment direction, and misalignment rotation amount. In other implementations, the misalignment information 222 may include more information than the misalignment status, misalignment direction, and misalignment rotation amount. For example, the misalignment information 222 may indicate to the operating system how to transform the image data 224. Put differently, the operating system may use the misalignment information 222 to transform the image data 224.

The misalignment information 222 may be one or more variables stored in the memory 214. In other words, the misalignment information 222 may be stored in a registry of the operating system. For example, the misalignment information 222 may be registered in a MICROSOFT operating system descriptor of the operating system. In other examples, the misalignment information 222 may be registered in a binary object store (BOS) descriptor of the operating system.

In some implementations, an image sensor driver may deliver the misalignment information 222 to the operating system. The misalignment information 222 may be determined by querying a driver for the image sensor 206. For example, the operating system may query the image sensor driver to determine the misalignment information 222. In other implementations, the image sensor driver may deliver the misalignment information 222 without a query from the operating system. In further implementations, the manufacturer stores the misalignment information 222 in the operating system.

In some implementations, the one or more processors 216 may include one or more computing components, such as a central processing unit ("CPU"), a graphics processing unit ("GPU"), and a vision processing unit ("VPU"). Each of these processors operates using a different memory format. For example, the CPU uses a CPU memory format, the GPU uses a GPU memory format, and the VPU uses a VPU memory format.

The image sensor 206 may provide the image data 224 in an image sensor memory format. For example, the image sensor 206 may provide the image data 224 in the CPU memory format. In other examples, the image sensor 206 may provide the image data 224 in the GPU memory format. In still other examples, the image sensor 206 may provide the image data 224 in the VPU memory format. In further examples, the image sensor 206 may provide the image data 224 in another memory format. In some implementations, the image sensor 206 may be an optical camera, meaning the image sensor 206 primarily captures wavelengths of light visible to the human eye. In other implementations, the image sensor 206 may capture wavelengths of light not visible to the human eye, such as infrared light, ultraviolet light, x-rays, and so forth. In still other implementations, the image sensor 206 may capture any wavelength or range of wavelengths of light.

In some implementations, one or more processors 216 may process the image data 224. For example, the CPU may process the image data 224, the GPU may process the image data 224, or the VPU may process the image data 224. The one or more processors may convert the image data 224 between different memory formats (for a more detailed discussion, see FIG. 5 and the associated text). In some implementations, processing the image data 224 may include facial recognition processing. In other implementations, processing the image data may include different image modification tasks, such as adding an overlay to the image data (e.g., a frame or bunny ears), changing the filter or brightness of an image, or changing the zoom of a region of the image.

Processing the image data 224 may include transforming the image data 224 to transformed image data 224-1, the image data 224 being in the misaligned (or sensor) orientation, and the transformed image data 224-1 being in the operational orientation. In some implementations, transforming the image data 224 may be the final act of the one or more processors 216 before the transformed image data 224-1 is communicated or delivered to the application 220 (for a more detailed discussion, see FIG. 6, FIG. 7, and FIG. 10 and the associated text). The operating system may then communicate or deliver the transformed image data 224-1 to the application 220.

In some implementations, a command and control loop may be established between the application 220, the processors 216, and/or the image sensor 206. For example, the application may request a modification (e.g., change the zoom, filter, or add an overlay such as bunny ears to the image data or a portion of the image data) to the transformed image data 224-1. The first act the one or more processors 216 may perform may be to transform the proposed modification back to the sensor orientation. The one or more processors may then communicate the proposed modification back to the image sensor 206 which may modify the image data accordingly (for a more detailed discussion, see FIG. 8 and FIG. 11 and the associated text).

Figure 3:
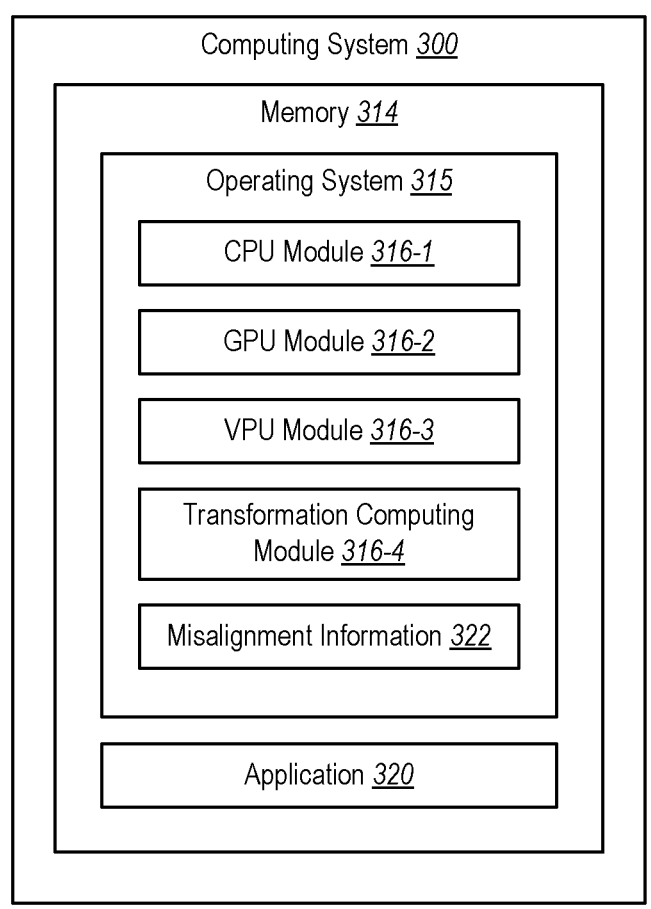
FIG. 3 is block representation of an operating system, according to at least one implementation of the present disclosure.

FIG. 3 is a software representation of a computing system 300. The computing system 300 may include memory 314 having instructions executable by one or more processors (e.g., one or more processors 216 of FIG. 2). The memory 314 may include an operating system 315. An image sensor module 306 may manage an image sensor (e.g., image sensor 206 of FIG. 2). The operating system 315 may further include one or more computing modules. The one or more computing modules may be associated with a computing component, such as a processor (e.g., the one or more processors 216 of FIG. 2). For example, the operating system 315 may include one or more of a CPU computing module 16-1, a GPU computing module 16-2, a VPU computing module 16-3, and a transformation third computing module 16-4. In some implementations, the transformation third computing module 16-4 may be included in one or more of the CPU third computing module 16-1, the GPU third computing module 16-2, or the VPU third computing module 16-3.

The memory 314 may include one or more applications 320. In some implementations, the operating system 315 may control the one or more applications 320. The operating system may use the misalignment information 322 registered in the memory 314 to help optimize the number of conversions between memory types that are made by the computing modules. The final computing module may transform the image data from the sensor orientation to the operating orientation, and communicate the image data to the application 320. Thus, in some implementations, the operating system manages the flow of the image data between individual computing modules, and between the computing modules and the application 320.

Figure 4:
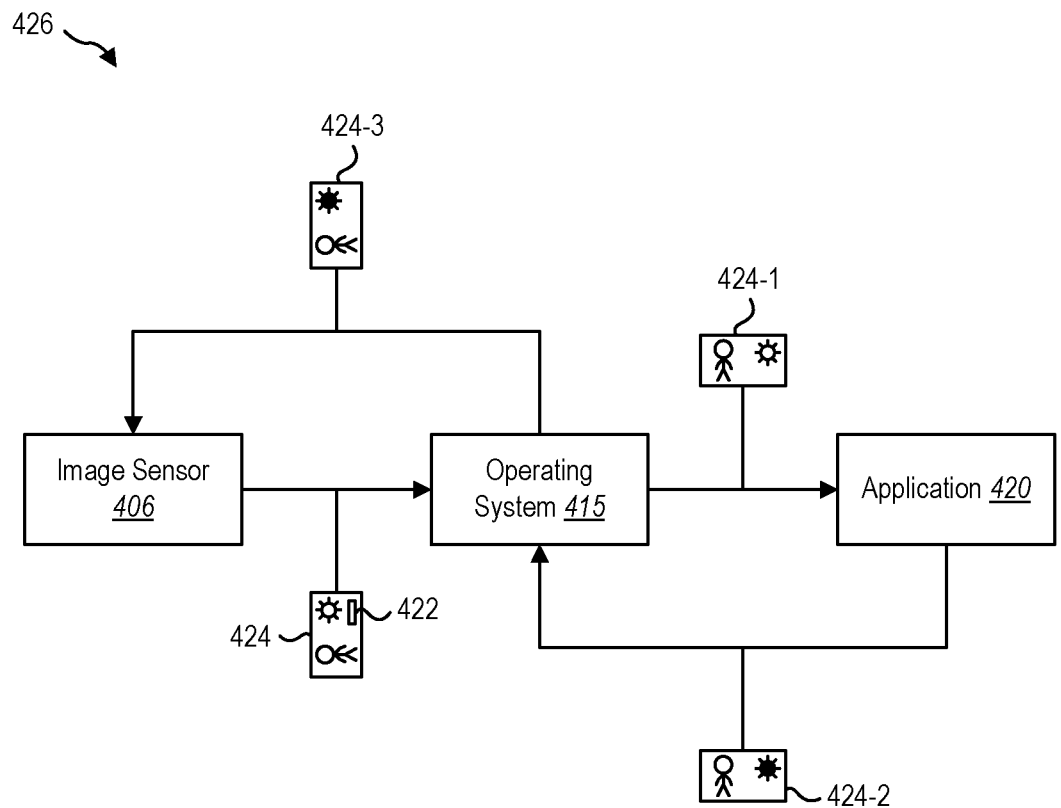
FIG. 4 is a representation of an image data pipeline, according to at least one implementation of the present disclosure.

FIG. 4 is a representation of an implementation of an image data pipeline 426. The image data pipeline 426 is a representation of the sequential processing that may be performed on image data 424. Alternatively or additionally, the image data pipeline 426 represents each step the image data 424 must go through before it is communicated or delivered to the application 420. An image sensor 406 is in communication with an operating system 415. Misalignment information 422 is stored (e.g., registered) in the operating system 415. In some implementations, the misalignment information 422 may be included with the image data 424. In other words, the image sensor 406 may constantly send or register misalignment information 422 to the operating system 415. In this manner, misalignment information 422 may be constantly (e.g., with each frame of the image data 424), periodically (e.g., regularly or at regular intervals), or episodically (irregularly, or associated with a specific event) updated in the operating system 415, in case the misalignment information 422 is changed or altered. In further implementations, the misalignment information 422 may be stored in the operating system 415 by the manufacturer.

In other implementations, the misalignment information 422 may be registered with the operating system 415 a single time (i.e., only once). In one configuration, memory in the operating system 415 may permanently store the misalignment information 422. In this manner, the data required to be transferred by the image sensor 406 may be reduced, thereby freeing up processing power to deliver higher resolution image data 424, higher framerate image data 424, or other beneficial information in combination with the image data 424.

The operating system 415 may receive and process the image data 424 using one or more computing components. Processing the image data may include transforming the image data 424 to transformed image data 424-1. After processing the image data 424, the operating system 415 may deliver or communicate the transformed image data 424-1 to an application 420. In some implementations, the application 420 may be an image capture application. In other implementations, the application 420 may be installed by a third-party, such as a social medial or image processing application.

In some implementations, the application 420 may send a request back to the operating system 415. For example, the request may be to modify the transformed image data 424-1. The request may include a proposed image data modification 424-2. The proposed image data modification 424-2 may include a filter, an image add-on or overlay (such as a frame, a dog-nose, or bunny ears overlaid on a portion of the image data 424). The proposed image data modification 424-2 may be global, meaning a request to modify all of, or an entirety of, the transformed image data 424-1. Alternatively, the proposed image data modification 424-2 may be local, meaning a request to modify a portion of the transformed image data 424-1. The portion of the transformed image data 424-1 may be a specific pixel or group of pixels at a location on the transformed image data 424-1. The portion of the transformed image data 424-1 may include a varying group of pixels, such as a moving target in the transformed image data 424-1. As shown, the proposed image data modification 424-2 may be a request to alter a color of an element in the image.

In some implementations, a user may initiate the request for the proposed image data modification 424-2. For example, a user of an application 420 may desire a filter or an overlay to be applied to the transformed image data 424-1. In other implementations, the request for the proposed image data modification 424-2 may be initiated by the application 420. For example, the application 420 may detect a general image brightness and automatically send a request for a proposed image data modification 424-2 to reduce the image brightness. In other examples, a region of interest identified by the user or the application 420 may narrow down statistics used by a 3A algorithm in the image sensor driver. In still other examples, the image data pipeline 426 may be used to track a patch of the region of interest over time.

The operating system 415 may receive the request from the application 420 to modify the portion of the transformed image data 424-1, including the proposed image data modification 424-2. In some implementations, the operating system 415 may process the proposed image data modification 424-2. For example, the operating system 415 may transform the proposed image data modification 424-2 from the operating orientation to the sensor orientation. The operating system 415 may then communicate the transformed proposed image data modification 424-3 to the image sensor 406. The image sensor 406 may then modify the image data 424 according to the transformed proposed image data modification 424-3 and communicate the modified image data to the operating system 415, thereby starting a new iteration of the image data pipeline 426.

In this manner, a feedback loop may be created between the image sensor 406 and the application 420. Because the image sensor 406 may be the best suited (in comparison to the application 420 and/or the operating system 415) to modify image data 424, this may improve the quality of the modified image data 424. For example, an image sensor 406 driver may be optimized to apply a brightness adjustment or color filter to the image data, which may improve the speed of the modification and/or provide better visual quality of the modification.

In some implementations, the operating system 415 may process the proposed image data modification 424-2 without sending the transformed proposed image data modification 424-3 to the image sensor 406. For example, in some implementations, an overlay on image data may be applied by the operating system 415, rather than the image sensor 406. This may reduce the overall number of times the image data 424 is handled, thereby improving the framerate, resolution, and/or otherwise improving the final quality of the image data 424 delivered to the application 402.

Figure 5:
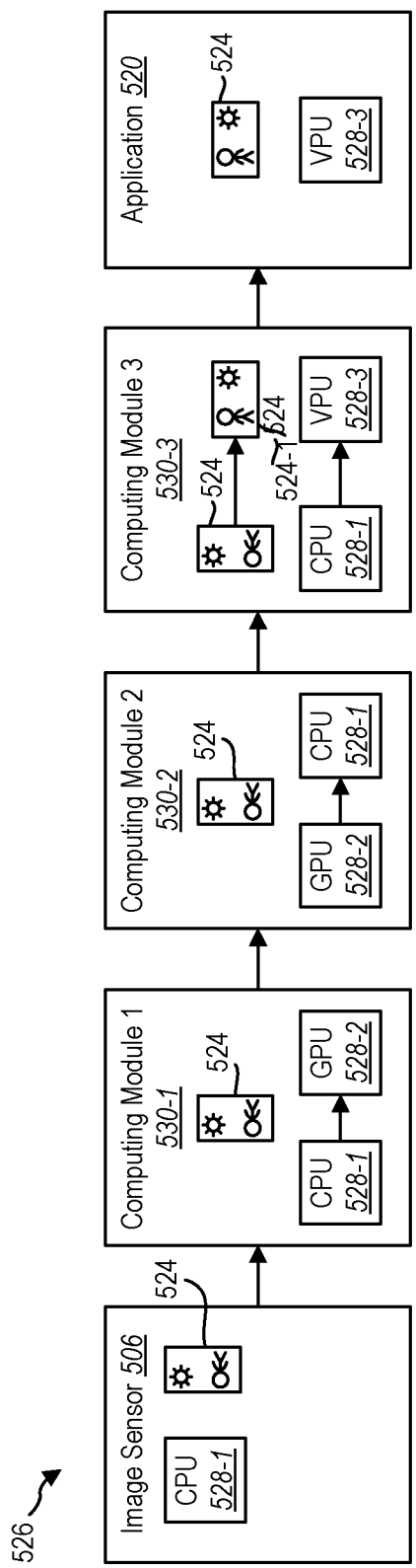
FIG. 5 is another representation of an image data pipeline, according to at least one implementation of the present disclosure.

FIG. 5 is a representation of an implementation of an image data pipeline 526. The image sensor 506 may collect image data 524. The image sensor 506 may collect image data 524 in 1080 width×1920 height (9×16) resolution, as opposed to the resolution typically used for viewing images, which is 1920 width×1080 height (16×9) resolution. Furthermore, the application 520 may require 16×9 resolution. It may be more efficient for the operating system to transform the image data 524, rather than to have the image sensor driver for the image sensor 506 transform the image data, or for the application 520 to instruct the operating system to transform the image data 524. Thus, the image sensor driver does not transform the image data 524. In this manner, the image sensor 506 may provide the misaligned image data 524 in a native format or orientation, and the application 520 will receive transformed image data 524-1, with neither the image sensor 506 nor the application 520 including any instructions to transform the image data 524.

In some implementations, the image sensor 506 may deliver the image data 524 in a first memory format 528-1 (i.e., memory layout), such as CPU memory format. An operating system (such as operating system 415 of FIG. 4) may process the image data 524 using one or more computing components (such as the one or more processors 216 of FIG. 2). For example, first computing module 530-1 may manage a first computing component. A first computing module 530-1 may receive the image data from the image sensor 506 through the operating system, and process the image data 524 in the first memory format 528-1. The first computing module 530-1 may then convert the image data 524 from the first memory format 528-1 into a second memory format 528-2, such as GPU memory format. The first computing module 530-1 may then transfer or deliver the image data 524 to a second computing component, managed by a second computing module 530-2 in the second memory format 528-2.

The second computing module may then process the image data 524 and/or convert the image data 524 back to the first memory format 528-1. The second computing module may then transfer or deliver the image data to a final computing component, which may be a third computing component, a fourth computing component, or any numbered computing component as long as it is the final computing component, managed by the final computing module (in this example, the third computing module 530-3) in the first memory format 528-1. In some implementations, the first computing component, the second computing component, and the final computing components may be different.

The third computing module 530-3 may then process the image data 524 and/or convert the image data 524 to a third memory format 528-3, such as VPU memory format. The third computing module 530-3 may further transform the image data 524 into transformed image data 524-1. The third computing module may then deliver or transfer the transformed image data 524-1 to the application 520. It should be noted that, in some implementations, the operating system may include more than three computing modules that process the image data 524. For example, the operating system may include four, five, six, seven, eight, nine, ten, 100, or 1,000 computing modules.

Each of the computing modules (such as the first computing module 530-1, the second computing module 530-2, and the third computing module 530-3) require that the image data 524 have a specific memory format (such as CPU memory format, GPU memory format, or VPU memory format). Therefore, as described above, the image data 524 must be converted between memory formats. Each conversion between memory formats may result in a loss of image data 524 quality. For example, the image sensor 506 may collect the image data 524 having a native framerate. Each conversion between memory formats occurs over a period of time. Therefore, multiple conversions will take multiple periods of time. At some point, the aggregation of the multiple periods of time may result in one or more frames of the image data 524 being "dropped." Put differently, the operating system may not be able to process every frame of the image data in real time, and so some frames will not be processed or transferred to the application 520. In some instances, dropping frames may reduce the overall quality of video data delivered to the application 520. Therefore, multiple conversions between memory formats may reduce the quality of image data 524.

In some implementations, each time image data 524 is processed, converted, or handled, some of the resolution (i.e., the pixel density or pixel count), may be reduced. In other words, the fidelity of the image may be reduced. Therefore, similar to the discussion above regarding framerate, multiple conversions between memory formats may reduce the resolution of image data 524. Alternatively or additionally, multiple conversions may reduce the quality of the image data 524 such that in order to display the image data 524 in real time (e.g., without buffering after initial display), the resolution and/or framerate of the image data 524 must be reduced.

In some implementations, conversion between memory formats may be necessary, because different processors or computing modules require different memory formats. Ordering the processing for the image data 524 (e.g., the image data pipeline 426) may improve the quality of image data. For example, ordering the processing of the image data 524 to have all computing modules utilizing the first memory format 528-1, which may be the memory format delivered by the image sensor 506, to process the image data in turn (e.g., one after the other, or all in a row) may limit the number of, or completely eliminate, conversions back to the first memory format 528-1.

Similarly, having all computing modules utilizing the second memory format 528-2 process the image data in turn (e.g., after the computing modules processing using the first memory format 528-1, and one after another, or all in a row) may limit the number of conversions to the second memory format 528-2. In some implementations, the number of conversions to the second memory format 528-2 is one (e.g., a single conversion to the second memory format 528-2).

Similarly, having all computing modules utilizing the third memory format 528-3 process the image data in turn (e.g. after the computing modules processing using the second memory format 528-2, and one after another, or all in a row) may limit the number of conversions to the third memory format 528-3. In some implementations, the number of conversions to the third memory format 528-3 is one, (e.g., a single conversion to the third memory format 528-3). In some implementations, the third memory format 528-3 is the memory format that the application 520 uses. In this manner, three memory formats (e.g., the first memory format 528-1, the second memory format 528-2, and the third memory format 528-3) may be used with only two conversions between memory formats. In other implementations, due to processing constraints, such as an order of processing operations that must be followed, or a request from the application 520, multiple conversions between memory formats may be necessary. Thus, less than two, less than three, less than four, less than 5, less than 10, less than 15, less than 20, or more than 20 conversions between memory formats may occur.

In some implementations, more or less than three memory formats may be utilized. For example, the image sensor 506 may deliver the image data 524 in the same memory format used by the application 520, and the operating system may process the image data 524 in the same memory format. In other examples, two memory formats, or more than three memory formats may be used.

In some implementations, the image data 524 may be transformed at the application 520. However, many different developers develop applications 520. This may lead to inconsistent transformations of the image data 524, with different applications 520 utilizing different computing modules of the operating system to transform the image data 524. This may result in differing levels of final image or video quality.

In other implementations, the operating system may transform the image data 524 before the image data reaches the application 520. In this manner, the application 520 does not know if the image sensor 506 is aligned or misaligned. Indeed, the application 520 is then agnostic to the alignment of the image sensor 506 because the transformed image data 524-1 is the only image data 524 that the application 520 knows about or receives.

In some implementations, transforming the image data 524 to transformed image data 524-1 may occur in the same step as the conversion from the first memory format 528-1 to the second memory format 528-2, or the conversion from the second memory format 528-2 to the third memory format 528-3, which may be the final memory format. In this manner, the transformation and the conversion may occur in a single step, thereby saving processing time and improving the final image or video quality. Thus, the transformation may occur at any memory format conversion along the image data pipeline 526. The application 520 may communicate to the operating system in which memory format the application 520 will use the image data 524, and the operating system will then transform the image data 524 at the computing module where the memory format conversion happens.

In some implementations, different applications 520 and/or different processing needs may change the order and/or configuration of the image data pipeline 526. Thus, when the transformation of the image data 524 occurs at the same time as a memory format conversion, the location of the transformation along the image data pipeline 526 may change to coincide with the memory format conversion. In this manner, registered (i.e., stored) misalignment information (e.g., misalignment information 222 of FIG. 2) may be used by the application 520 and the operating system to optimize the image data pipeline 526. In other words, the registered misalignment information may be used to limit the number of memory format conversions of the image data 524.

Figure 6:
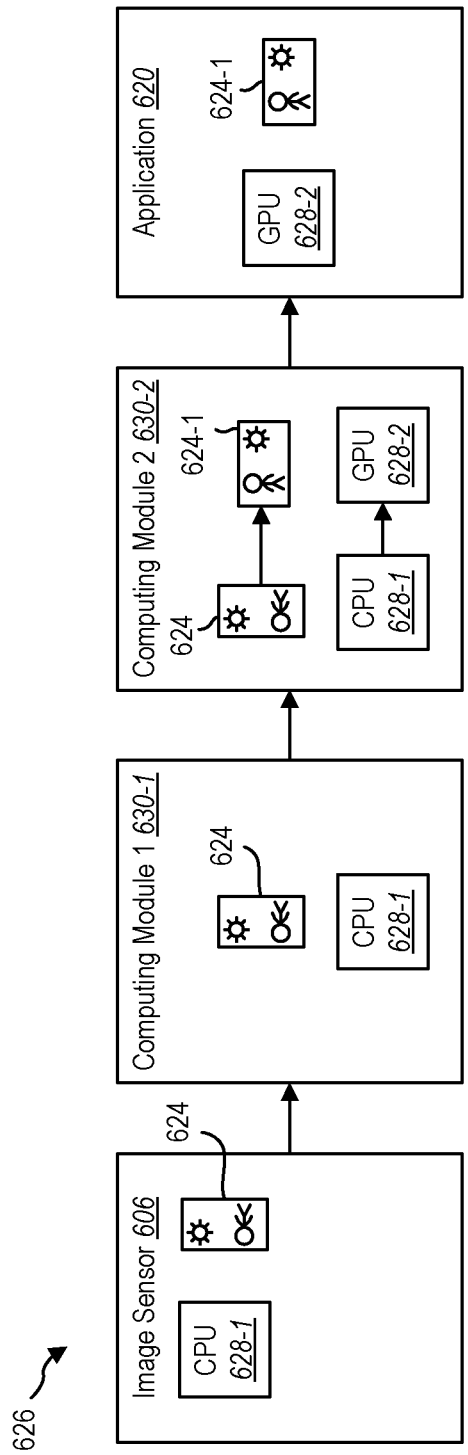
FIG. 6 is yet another representation of an image data pipeline, according to at least one implementation of the present disclosure.

FIG. 6 is a representation of an implementation of an image data pipeline 626. In some implementations, the transformation of the image data 624 occurs immediately before the transformed image data 624-1 is communicated to the application 620. The image sensor 606 may collect image data 624 that is misaligned with an operational orientation of a computing device. The image sensor 606 may deliver the image data 624 to one or more computing modules or computing components of an operating system in a first memory format 628-1, which may be CPU format memory. First computing module 630-1 may process the image data 624. Additional computing modules may process the image data, all using the same memory format 628-1. In some implementations, the first computing module 630-1 may be optional. Alternatively or additionally, the image data 624 may not need any processing before being converted from the first memory format 628-1 to the second memory format 628-2. Therefore, the image sensor 606 may deliver or communicate the image data 624 directly to the second computing module 630-2. This means that the image sensor 606 may directly deliver the image data 624 to the second computing module 630-2, which may, as a final act on the image data 624, transform the image data 624 to transformed image data 624-1. Further, in at least one implementation, the application 620 may utilize the first memory format 628-1. Thus, the image sensor 606 may directly communicate the image data 624 to the second computing module 630-2, which may, as a final act on the image data 624, transform the image data and send it to the application 620.

Second computing module 630-2 may convert the image data 624 from the first memory format 628-1 to a second memory format 628-2, which may be GPU format memory. In some implementations, the second computing module 630-2 may simultaneously transform the image data at the same time as the conversion between memory formats. This simultaneous conversion and transformation is a final act on the image data 624, because it is the last act prior to communicating the transformed image data 624-1 to the application 620. In other implementations, after the conversion, as a final act on the image data 624, the second computing module 630-2 may transform the image data 624 into transformed image data 624-1, which is aligned with the operational orientation. The transformed image data 624-1 may then be communicated to an application 620. Put differently, the transformation of the image data 624 is the final step performed on the image data 624 by the operating system before the transformed image data 624-1 is communicated to the application 620. The second computing module 630-2, which transforms the image data 624, may be the final computing module before the transformed image data 624-1 is communicated to the application 620. For example, in the image pipeline 626, immediately after the transforming the image data 624, the transformed image data 624-1 is communicated from the final computing module (e.g., second computing module 630-2) to the application 620. In further examples, the operating system performs no further processing of the image data 624 after it is transformed to the transformed image data 624-1. In some implementations, processing of the image data 624 may include any type of processing performed by the operating system, including displaying the image data 624 or any other type of handling, communication, or delivery of the image data 624.

It should be noted that the image sensor 606 may capture the image data 624 in any memory format, including CPU memory, GPU memory, or VPU memory. Further, the application 620 may utilize any memory format, including CPU memory, GPU memory, or VPU memory. Still further, the operating system (e.g., first computing module 630-1 and second computing module 630-2) may perform any memory format conversion (e.g., from CPU to GPU, from CPU to VPU, from GPU to CPU, from GPU to VPU, from VPU to CPU, and from VPU to GPU) in any order along the image data pipeline 626. Thus, multiple permutations of memory format conversions and image data 624 transformations may be possible, as needed by the operating system and/or the application 620.

Figure 7:
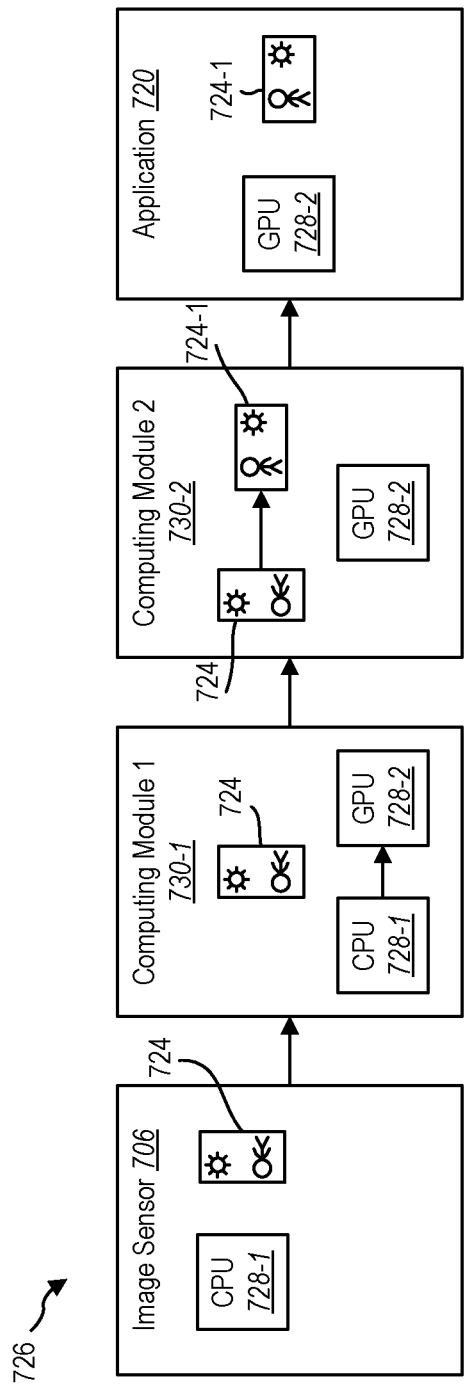
FIG. 7 is a further representation of an image data pipeline, according to at least one implementation of the present disclosure.

FIG. 7 is a representation of an implementation of an image data pipeline 726. The image sensor 706 may collect image data 724 that is misaligned with an operational orientation of a computing device. The image sensor 706 may deliver the image data 724 to one or more computing modules or computing components of an operating system in a first memory format 728-1, which may be CPU format memory. First computing module 730-1 may process the image data 724, and convert the image data 724 from the first memory format 728-1 to a second memory format 728-2, which may be GPU format memory. Second computing module 730-2 may then process the image data 724, and, as a final act, transform the image data 724 into transformed image data 724-1, which is aligned with the operational orientation. The transformed image data 724-1 may then be communicated to an application 720.

Figure 8:
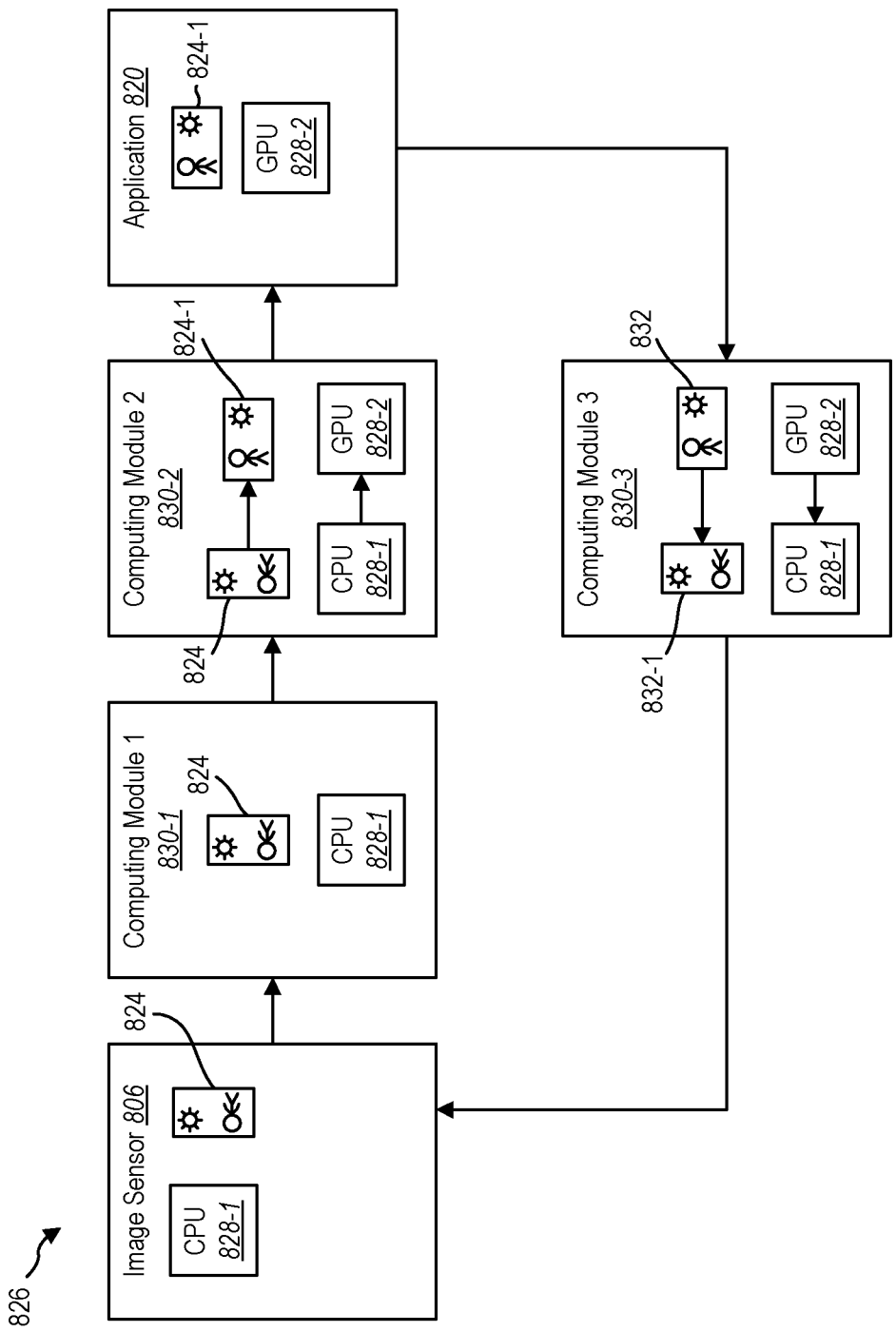
FIG. 8 is a representation of a command and control loop, according to at least one implementation of the present disclosure.

FIG. 8 is representation of an implementation of a command and control image data pipeline 826. The image sensor 806 may capture image data 824 in a first memory format 828-1 and communicate it to an operating system including at least one computing module. The image data 824 may be processed, converted from the first memory format 828-1 to a second memory format 828-2, transformed to transformed image data 824-1, and delivered to the application 820 as discussed above in reference to at least FIG. 6. The application 820 may send a request, or a payload, back to the operating system and/or the image sensor 806. For example, a user may identify a region of interest, such as a bounding rectangle 832, that instructs the image sensor 806 to modify the image data 824 based on a property of the bounding rectangle 832, such as contrast, brightness, focus, zoom, and so forth. In other examples, the application 820 may process the transformed image data 824-1 and determine that the brightness of a location in the transformed image data 824-1 is too high or too low, and automatically send a request to the image sensor 806 to alter the image brightness of an identified bounding rectangle 832.

The payload (including, for example, the bounding rectangle 832) sent back to the operating system may be aligned with the operational orientation. Thus, before sending the payload back to the image sensor 806 or the image sensor driver, the operating system needs to transform the bounding rectangle 832 in the operational orientation to a transformed bounding rectangle 832 in the sensor orientation. Because the payload only includes information regarding the location of the bounding rectangle 832 and the desired modification to the image data 824 within the bounding rectangle 832, the payload does not need to be in the second memory format 828-2 (such as GPU memory format). Therefore, the first act that the third computing module 830-3 may perform before performing any processing on the bounding rectangle 832 may be to convert the payload back from the second memory format 828-2 back to the first memory format 828-1. In some implementations, the third computing module 830-3 may simultaneously convert the second memory format 828-2 to the first memory format 828-1 at the same time as transforming the bounding rectangle 832 to the transformed bounding rectangle 832-1. Alternatively, the operating system may only transform the bounding rectangle 832 without converting the memory format. For example, if the application 820 and the image sensor 806 both use the same memory format, then no processing by the operating system (e.g., the first computing module 830-1 or the second computing module 830-2) may be required. In another example, the application 820, operating system, and image sensor 806 may all use the same memory format.

In some implementations, first computing module 830-1 (or any other computing module of the operating system) may process the region of interest, or the bounding rectangle 832. For example, first computing module 830-1 may include facial recognition software that may provide a location of a face, and possibly an identity of the person to whom the face belongs. In other examples, the region of interest may be an area to be zoomed. In still other examples, the region of interest may be application specific, such as an overlay over a portion of the image (e.g., bunny ears).

In some implementations, the entire image data pipeline 826 may be processed in real time relative to capturing or collecting the image data 824 by the image sensor 806. For example, if a minimum video output of the application 820 is 30 frames per second, then the entire image data pipeline 826 must be able to process at a minimum 30 frames per second. If the image sensor 806 has the capacity of capturing and delivering a higher frame rate (such as 60, 90, 120, 180, 240, or 480 frames per second), then the operating system does not have to process every frame delivered by the image sensor 806 to meet the minimum video output of the application 820. For example, if the image sensor 806 delivers 240 frames per second, and the minimum video output of the application 820 is 60 frames per second, then there is a factor of safety of 4, meaning that the image sensor 806 delivers four times as many frames as required by the application 820. This means that up to three out of every four frames may be dropped, or not processed. In further examples, if the image sensor 806 delivers 180 frames per second, and the minimum video output is 30 frames per second, then there is a factor of safety of 6. Thus, the factor of safety is a measure of the efficiency of the operating system. Understanding the factor of safety may help to understand the best way to optimize the image data pipeline 826.

For example, an image data pipeline that has a higher factor of safety may have a different image data pipeline 826 than one with a lower factor of safety. Furthermore, optimizing the image data pipeline 826 to reduce the amount of processing per frame required may reduce power consumption requirements of image processing. This may expand the battery life of an electronic device, and/or cool down the electronic device.

Figure 9:
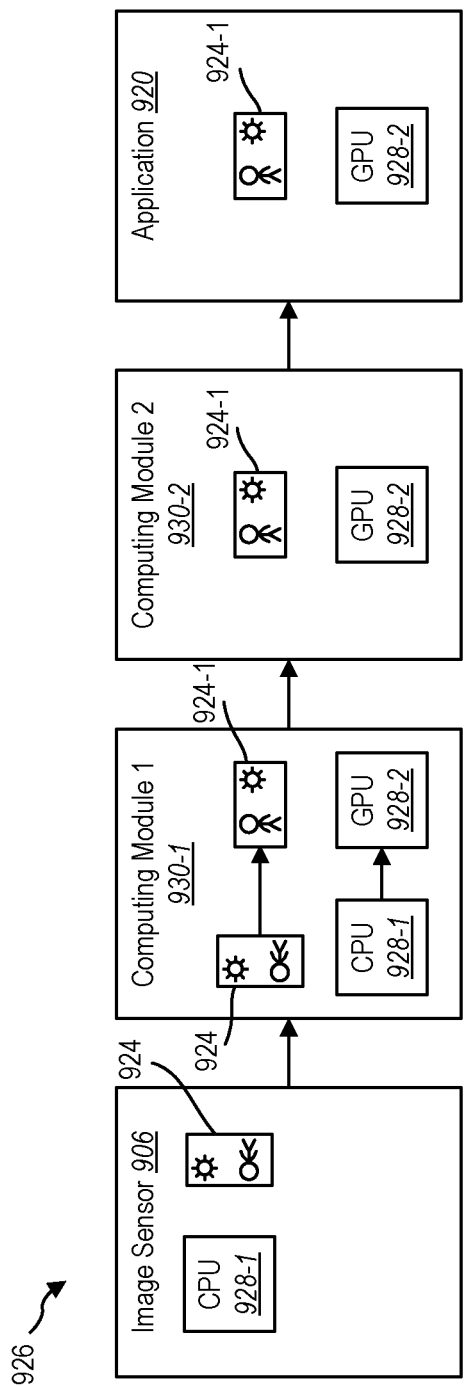
FIG. 9 is representation of an image data pipeline, according to at least one implementation of the present disclosure.

FIG. 9 is a representation of an implementation of an image data pipeline 926. An image sensor 906 may collect image data 924 having a sensor orientation. The image data 924 may be collected in a first memory format 928-1 (such as CPU memory). The image sensor 906 may deliver or communicate the image data 924 to the operating system. In some implementations, first computing module 930-1 may, after receiving the image data 924, and before performing any other action or processing, transform the image data 924 having the sensor orientation to transformed image data 924-1 having an operational orientation. In other words, transforming the image data 924 may be the first act of first computing module 930-1.

The transformed image data 924-1 may then be communicated to other computing modules within the operating system (such as second computing module 930-2) and/or the application 920. Put differently, the transformation of the image data 924 is the first step by the operating system on the transformed image data 924-1 before the transformed image data 924-1 is communicated to any other portion of the image data pipeline 926. The first computing module 930-1, which transforms the image data 924, may be the first computing module before the transformed image data 924-1 is further processed. In some examples, immediately after the receiving the image data 924, the first computing module 930-1 transforms the image data 924 from the sensor orientation to the operating orientation. In further examples, the operating system performs no processing of the image data 924 until it has transformed the image data 924 to the transformed image data 924-1.

The application 920 may require the transformed image data 924-1 to be in a second memory format (such as GPU memory). To accommodate this requirement, the first computing module 930-1 may convert the image data 924 from the first memory format 928-1 to the second memory format 928-2. In some implementations, to save processing time, the first computing module 930-1 may both convert the image data 924 from the first memory format 928-1 to the second memory format 928-2 and simultaneously transform the image data 924 to the transformed image data 924 as the first action of the operating system as described above. In this manner, the operating system may only process the transformed image data 924-1 (in the operating orientation) in the second memory format 928-1. In other words, the image data pipeline 926 may be optimized to the application 920. Thus, the application 920 and misalignment information (e.g., misalignment information 222 of FIG. 2) provided by the image sensor 906 may help to optimize the image data pipeline 926 to prevent extra memory format conversions.

Figure 10:
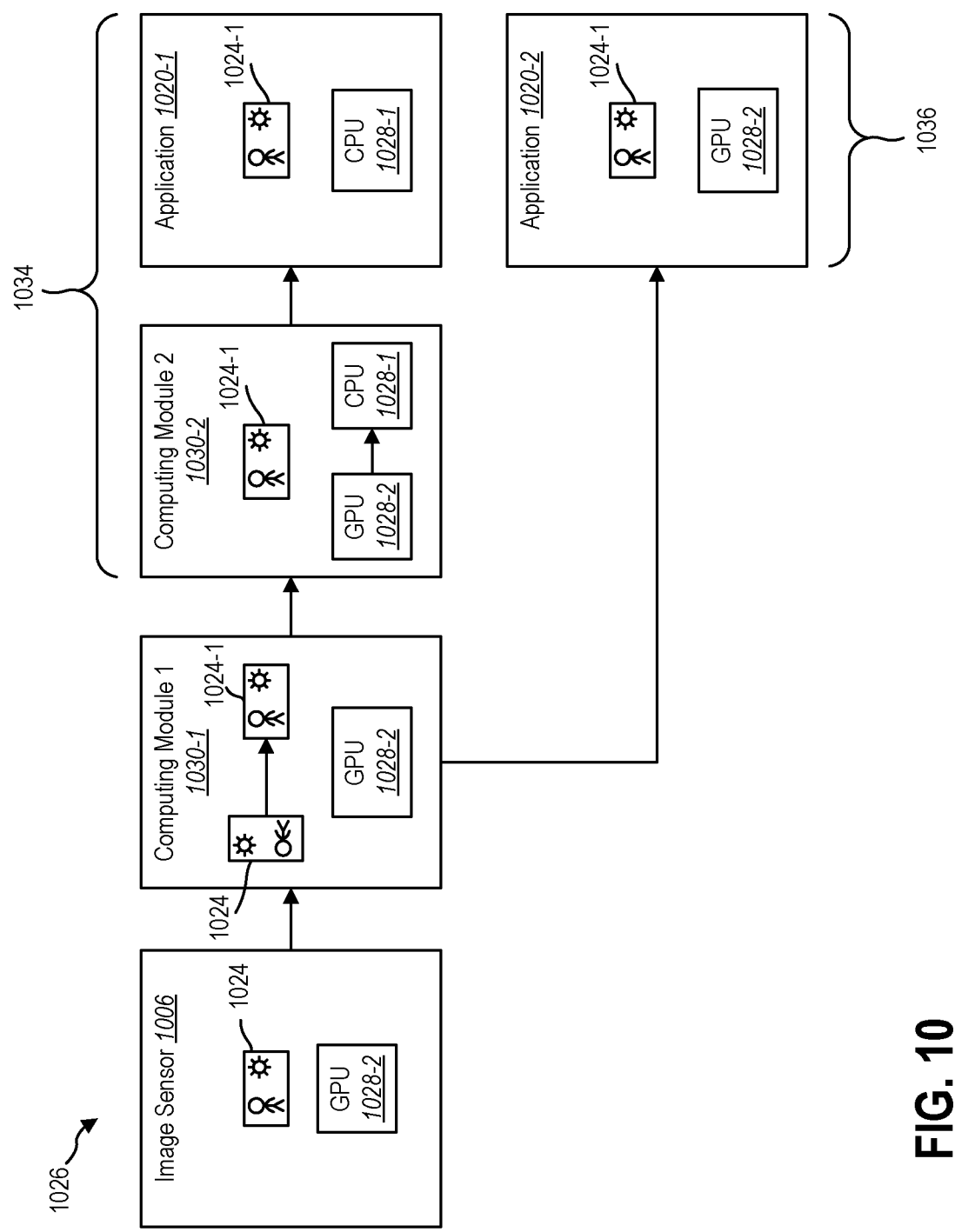
FIG. 10 is another representation of an image data pipeline, according to at least one implementation of the present disclosure.

FIG. 10 is a representation of an image data pipeline 1026 having a first application 1020-1 and a second application 1020-2. The first application 1020-1 may require a first memory format 1028-1 (such as CPU memory) and the second application 1020-2 may require a second memory format 1028-2 (such as GPU memory). The image sensor 1006 may collect and communicate image data 1024 having the second memory format 1028-2. Because the second application 1020-2 requires the native memory format (e.g., the second memory format 1028-2) of the image data 1024, the first computing module 1030-1 may transform the image data 1024 to transformed image data 1024-1 without any memory format conversions before sending the transformed image data 1024-1 to the second application 1020-2. Thus, the transformation of the image data 1024 is the final act on the image data 1024 before sending the transformed image data 1024-1 to the second application 1020-2.

At this point, the image data pipeline 1026 may split. A first pipeline branch 1034 may include the second computing module 1030-2, which may convert the second memory format 1028-2 to the first memory format 1028-1 before delivering the transformed image data 1024-1 to the first application 1020-1. A second pipeline branch 1036 may be an optimized or streamlined pipeline branch without any memory format conversions. The transformed image data 1024-1 may be communicated directly to the second application 1020-2. In this manner, the first application 1020-1 may experience more latency, or drop more frames, than the second application 1020-2, because there are more memory format conversions in the first pipeline branch 1034.

Figure 11:
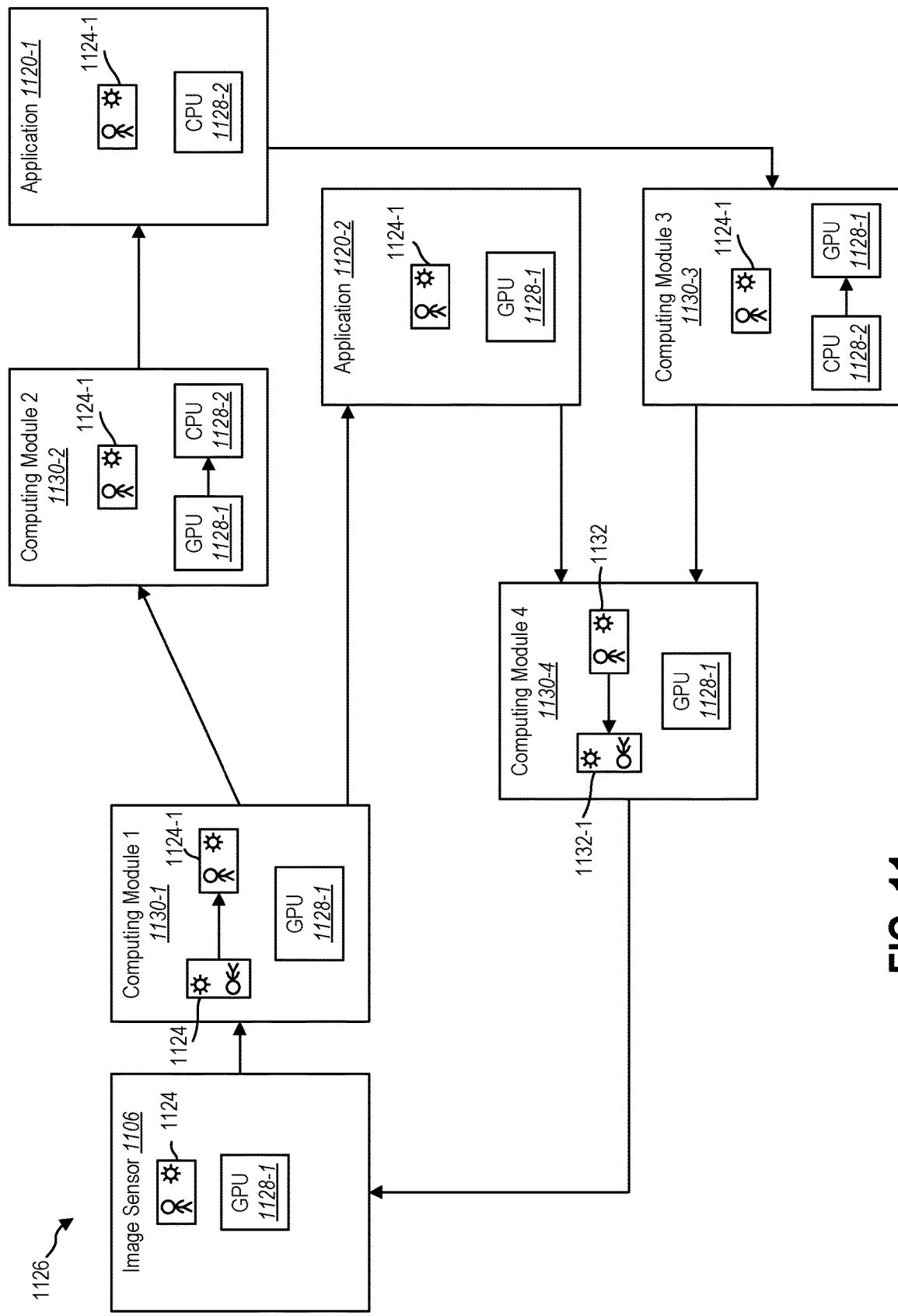
FIG. 11 is a representation of a command and control loop, according to at least one implementation of the present disclosure.

FIG. 11 is a representation of an image data pipeline 1126 having a first application 1120-1 and a second application 1120-2, similar to the implementation discussed in reference to FIG. 10. Image data 1124 from an image sensor 1106 may be delivered to a first computing module 1130-1. The first computing module 1130-1 may transform the image data 1124 to transformed image data 1124-1. A second computing module 1130-2 may convert the transformed image data 1124-1 from a first memory format 1128-1 to a second memory format 1128-2, and communicate the transformed image data 1124-1 to the first application 1120-1.

The first application 1120-1 may send a request to modify at least a region of interest, or bounding rectangle 1132, of the transformed image data 1124-1 back to the operating system. A third computing module 1130-3 may convert the request from the second memory 1128-2 type back to the first memory format 1128-1.

The first computing module 1130-1 may communicate or deliver the transformed image data 1124-1 in the first memory format 1128-1 to the second application 1120-2. The second application 1120-2 may send a request to modify at least the bounding rectangle 1132 back to the operating system. A fourth computing module 1130-4 may receive the request from third computing module 1130-3 and/or from the second application 1120-2. Immediately after receiving the region of interest or the bounding rectangle 1132, the fourth computing module 1130-4 may transform the bounding rectangle 1132 to a transformed bounding rectangle 1132-1 and communicate the request to the image sensor 1106 or another computing module of the operating system. For example, the transformation of the region of interest or the bounding rectangle 1132 is the first step by the operating system on the region of interest or the bounding rectangle 1132 before the transformed bounding rectangle 1132-1 is communicated to any other portion of the image data pipeline 1126. The fourth computing module 1130-4, which transforms the region of interest or the bounding rectangle 1132, may be the first computing module before the transformed bounding rectangle 1132-1 is further processed. In further examples, the operating system performs no processing of the region of interest or the bounding rectangle 1132 until it has transformed the region of interest or the bounding rectangle 1132 to the transformed bounding rectangle 1132-1. However, in some embodiments, other processing by the operating system may occur, that is not processing of the region of interest or the bounding rectangle 1132, such as batching of multiple requests or keeping the most recent unprocessed request.

In this manner, the image data pipeline 1126 may be a command and control loop for one or both of the first application 1120-1 and the second application 1120-2. Similar to the communication of all image data 1124 being communicated to the first application 1120-1 and the second application 1120-2 being passed through the first computing module 1130-1, all requests for modification of the image data 1124 may pass through the fourth computing module 1130-4, which may transform the bounding rectangle 1132 to the sensor orientation.

Figures 1, 12:
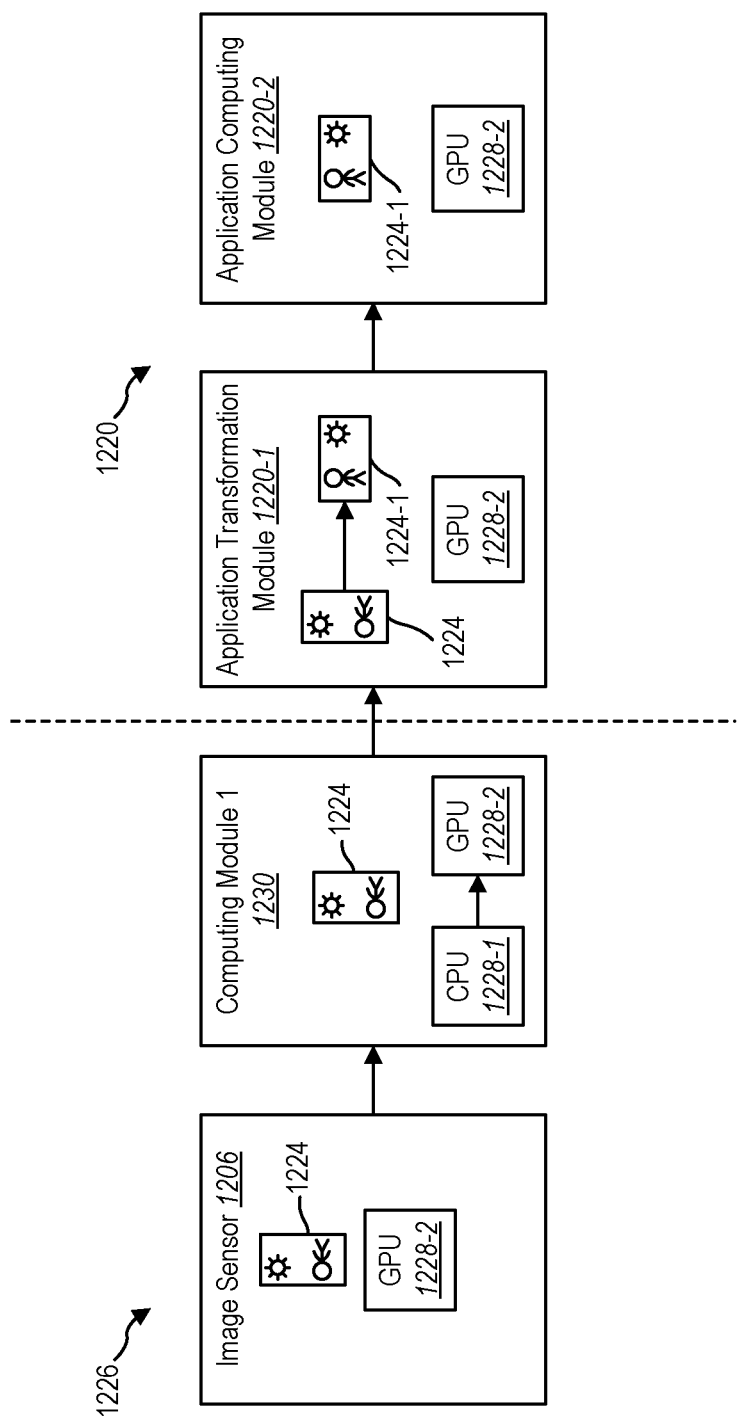
Figures 2, 12:
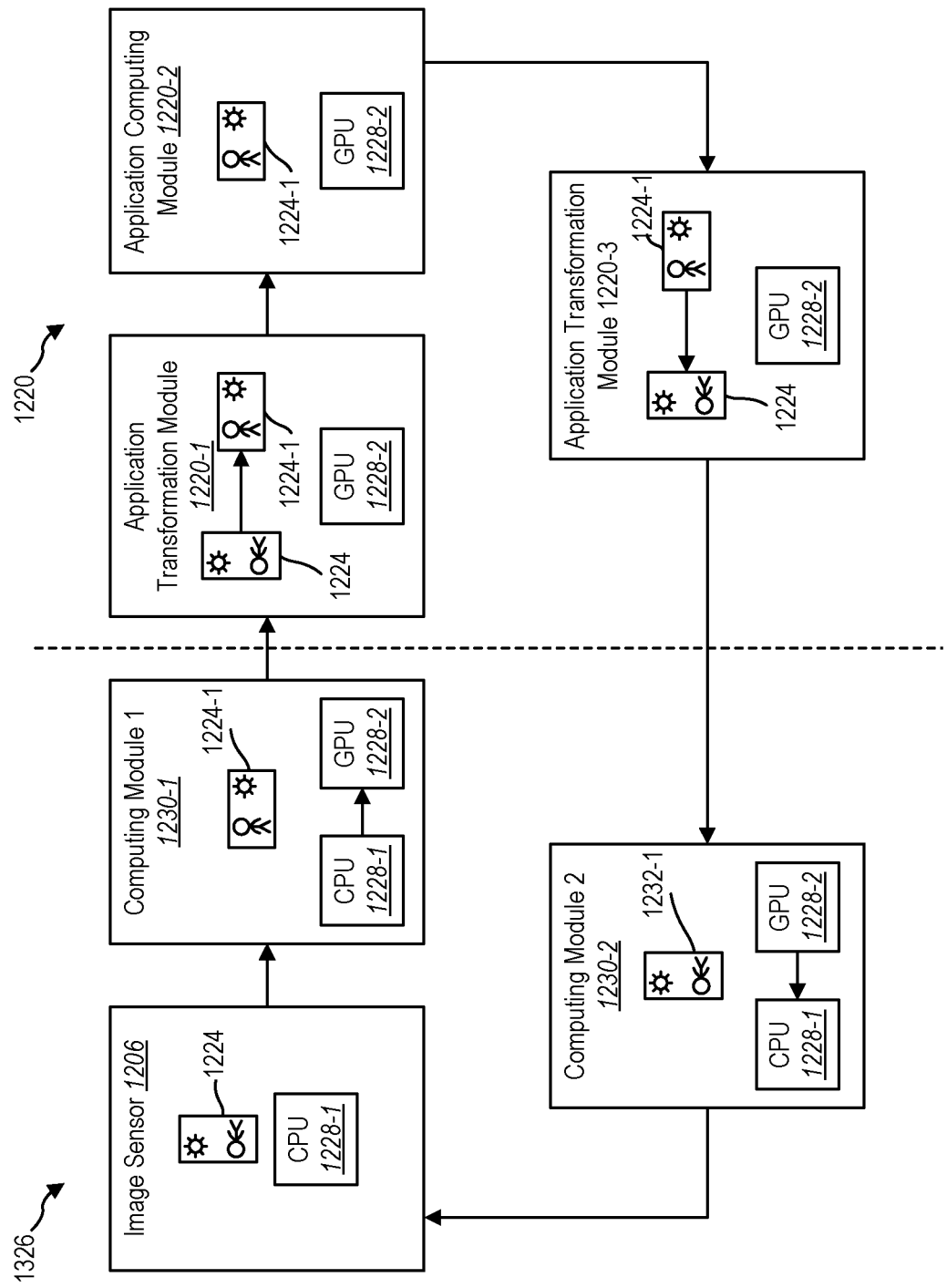

FIG. 12-1 is a representation of an implementation of an image data pipeline 1226. An image sensor 1206 may capture image data 1224 and communicate the image data 1224 to a first computing module 230. In some implementations, the first computing module 230 may convert the image data 1224 from the first memory format 1228-1 to the second memory format 1228-2, which may be the same memory format as that used by the application 1220. In other implementations, the image sensor 1206 may capture image data 1224 having the same memory format at that used by the application 1220, making the first computing module 230 optional.

Immediately after the application 1220 receives the image data 1224, an application transformation module 1220-1 may transform the image data 1224 from a sensor orientation to transformed image data 1224-1 having an operating orientation. In other words, the transformation of the image data 624 is the first step by the application 1220 on the image data 1224 after image data is 1224 is received from the operating system. The application transformation module 1220-1, which transforms the image data 1224 to transformed image data 1224-1, may be the first act the application 1220 performs on the image data 1224 before the transformed image data 1224-1 is further processed by the application 1220 (e.g., by application transformation module 220-1). In some examples, immediately after the receiving the image data 1224, the application transformation module 1220-1 transforms the image data 1224 from the sensor orientation to the operating orientation. In further examples, the application 1220 performs no processing, including displaying, of the image data 1224 until it has transformed the image data 1224 to the transformed image data 1224-1.

FIG. 12-2 is a representation of an implementation of a command and control loop including the image data pipeline 1226 of FIG. 12-1. In some implementations, a request to modify a region of interest 1232 of the transformed image data 1224-1 may be sent from the application first computing module 220-2 back to the operating system. A second application transformation module 1220-3 may transform the region of interest 1232 from the operating orientation to a transformed region of interest 1232-1 in the sensor orientation. In some implementations, transforming the region of interest 1232 may be the final act of the application before communicating or delivering the transformed region of interest 1232-1 to the operating system. If necessary, a second computing module 1230-2 may convert the transformed region of interest 1232-1 from the second memory format 1228-2 to the first memory format 1228-1. The request, accompanied by the transformed region of interest 1232-1 may then be delivered to the image sensor 1206 to perform the modification. The modified image data 1224 may then be communicated or delivered to the application 1220 as discussed in reference to FIG. 12-1.

Figure 13:
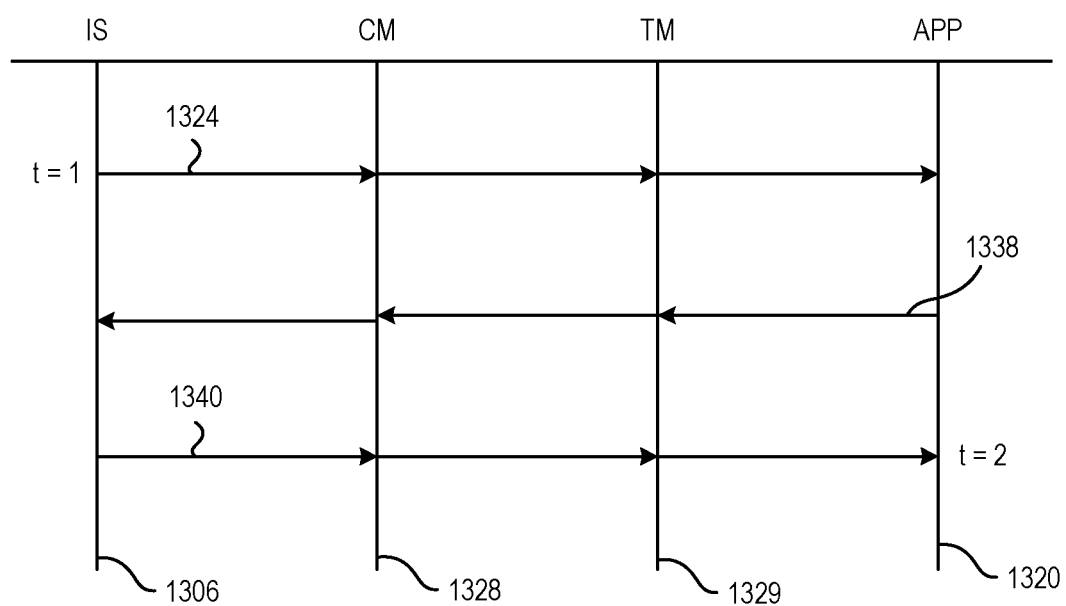
FIG. 13 is a representation of a string chart showing a flow of data, according to at least one implementation of the present disclosure.

FIG. 13 is a string diagram representative of an implementation of a data pipeline, where vertical lines represent components of the data pipeline where data may be processed, and horizontal arrows represent the flow of information. An image sensor at 1306 may deliver image data 1324 in a first orientation to a computing module at 1328. The computing module may be a part of an operating system of a computing device, and may process the image data 1324. In some implementations, the computing module may convert the image data 1324 between memory types, as may be required by the processing algorithms of the operating system or an application at 1320. In other implementations, the image data 1324 does not need any processing, and may be communicated directly to the transformation module at 1329. The transformation module may access memory having registered misalignment information to determine the existence of and possibly the direction and extent of misalignment of image data 1324. The transformation module may use the misalignment information to transform the image data 1324 to an operating or an application orientation.

In some implementations, transforming of the image data 1324 is the final act of the operating system on the image data 1324 before communicating or delivering the image data 1324 to the application. The application may then utilize the image data 1324. In some implementations, a request 1338 may be sent from the application back to the operating system. The request may include a request for further processing or modification of the image data 1324. For example, the application may request facial recognition software to analyze a region of interest of the image data 1324, and to provide either an identification or an approval based on a facial pattern. In other examples, the application may request the image sensor to alter a region of interest, such as zoom in on the region of interest, or focus on the region of interest, or change the brightness of the image data 1324 based on a brightness of the region of interest. In still other examples, the application may request the operating system or the image data 1324 to place an overlay on image data 1324 transmitted to the application. An overlay may be application specific, such as a dog nose, a portrait frame, or other overlay.

In some implementations, the application may request that the region of interest be based around a specific feature of the image data 1324. For example, an individual's face may be part of the image data 1324, but the face may move in reference to an origin of the image data 1324. The region of interest may be a rectangle surrounding the face that may move with the face. The modified image data 1340 may then be sent back to the application following a similar path as the original image data 1324.

In some implementations, the image data 1324 may be delivered or communicated from the image sensor to the application in real time. In other words, the image sensor may have a native capture framerate, and the application may have an operational framerate. Each processing act, including the processing of requests from the application, takes time. As the processing requirements increase, the processing time, or the total amount of time required to process the image data 1324 increases. At some point, the processing time per frame of image data 1324 exceeds the interval between which frames are sent from the image sensor. This means frames may be dropped, and a delivered frame rate less than the native frame rate is delivered to the application. Real time delivery occurs when the delivered frame rate is greater than the operation frame rate. Thus, real time delivery may occur when the processing time per frame is equal to or less than the time between which frames must be delivered to the application.

Figure 14:
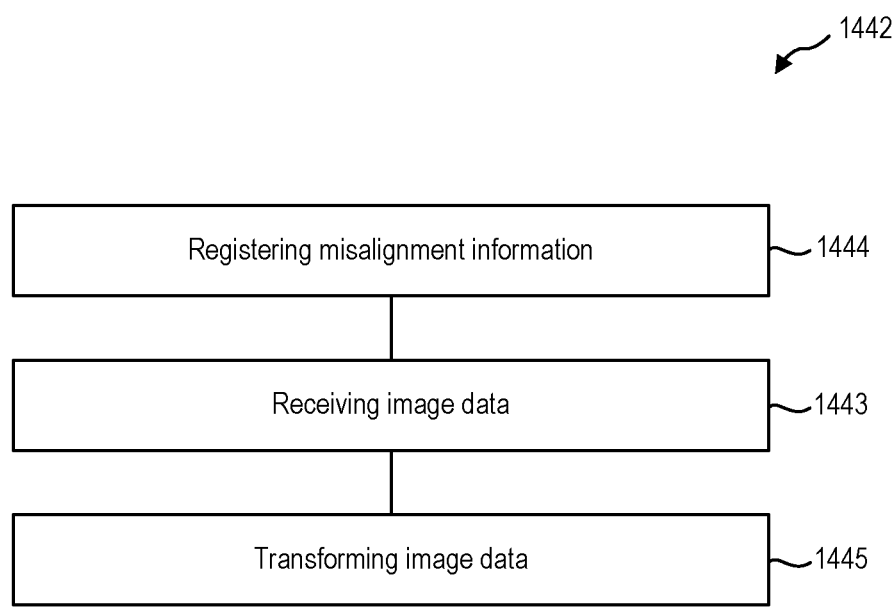
FIG. 14 is a representation of a method of transforming image misalignment, according to at least one implementation of the present disclosure.

FIG. 14 is an implementation of a method 1442 of transforming misalignment data from an image sensor in a computing device. The method may include registering misalignment information at 1444 of data in an image sensor in an operating system of the computing device. Image data may be received at 1443. The image data may be transformed from a sensor orientation to an operating orientation based on the misalignment data at 1445. The method may further include converting the data between memory formats.

Figure 15:
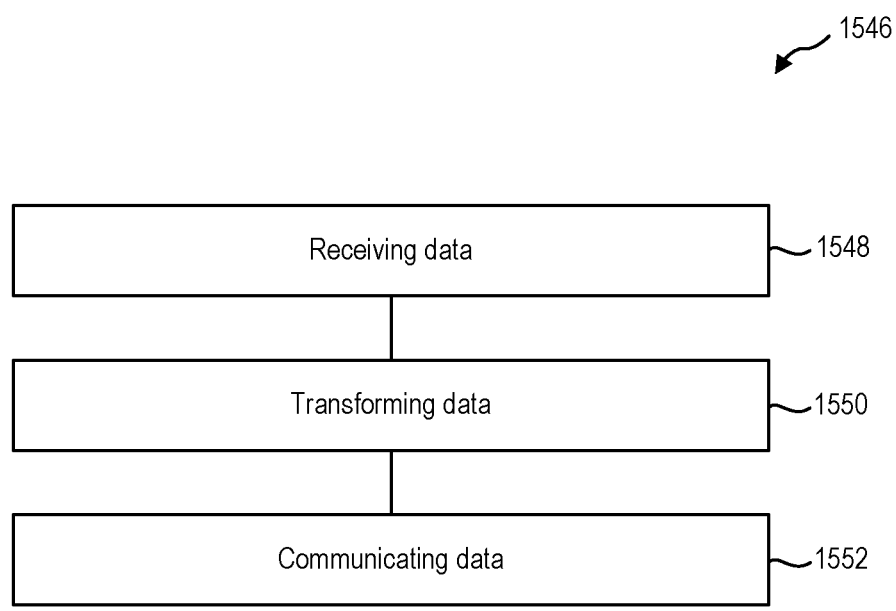
FIG. 15 is another representation of a method of transforming image misalignment, according to at least one implementation of the present disclosure.

FIG. 15 is an implementation of a method 1546 of transforming misalignment of an image sensor in a computing device. The method may include receiving data from an image sensor at a first computing component of a computing device at 1548. The data may be transformed using misalignment information stored in the operating system by a final computing component at 1550. Immediately after transforming the data, the data may be communicated from the final computing component to an application at 1552.

Figure 16:
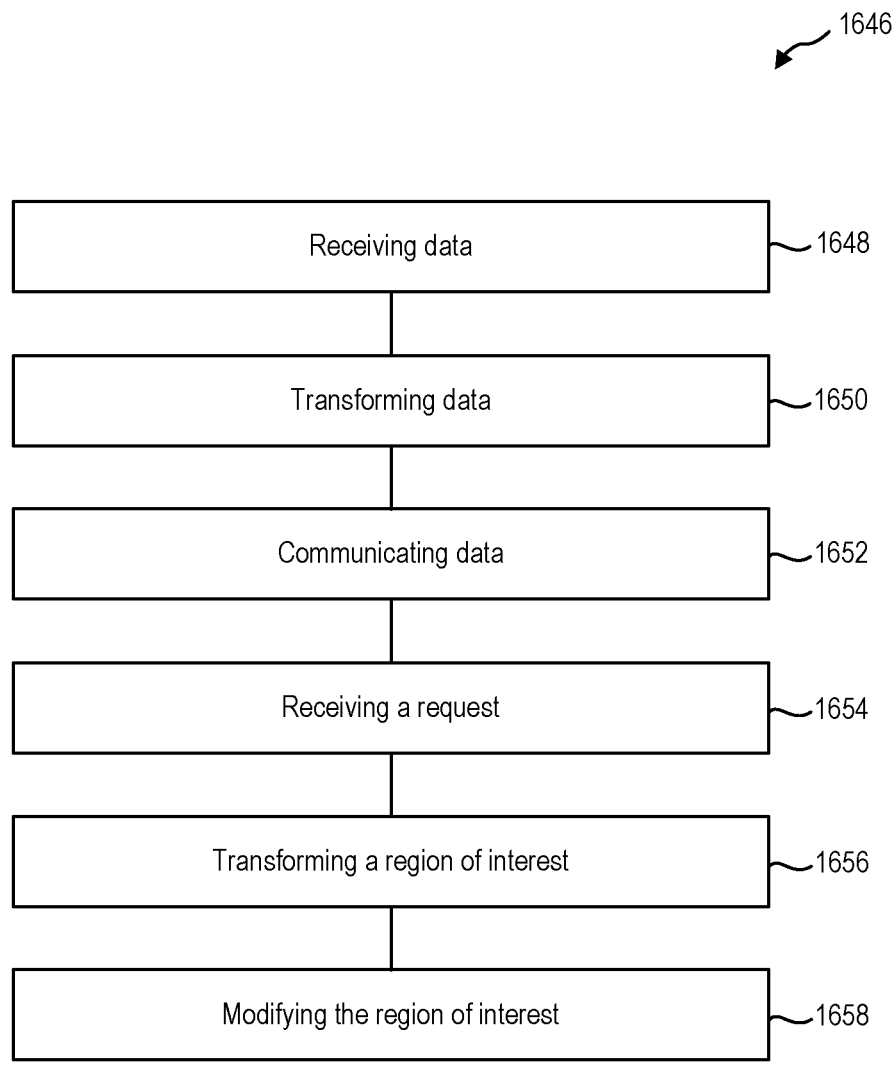
FIG. 16 is still another representation of a method of transforming image misalignment, according to at least one implementation of the present disclosure.

FIG. 16 is an implementation of a method 1646 of transforming misalignment of an image sensor in a computing device. The method may include receiving data from an image sensor at a first computing component of a computing device at 1648. The data may be transformed using misalignment information stored in the operating system by a final computing component at 1650. Immediately after transforming the data, the data may be communicated from the final computing component to an application at 1652. The operating system may receive a request from the application to modify a region of interest of the transformed data 1654. Immediately after receiving the request, the region of interest may be transformed back to the sensor orientation at 1656. The region of interest may then be modified by the image sensor or the operating system at 1658. The method may further include transforming the modified data back to the second orientation, and immediately after transforming the modified data, communicating the transformed modified data from the final computing component to the application.

Figure 17:
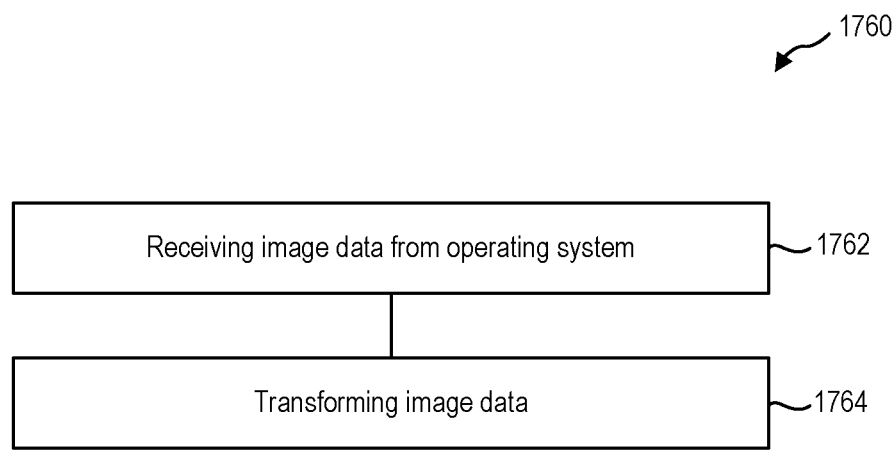
FIG. 17 is yet another representation of a method of transforming image misalignment, according to at least one implementation of the present disclosure.

FIG. 17 is an implementation of a method 1760 of transforming misalignment of data. The method may include receiving data from an image sensor through an operating system at 1762. After receiving the data, and before any other processing of the image data 1324, the data may be transformed using misalignment information stored in the operating system at 1764.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of transforming image misalignment, comprising:
    in an operating system of a computing device with an image sensor on the computing device that is misaligned relative to the computing device:
        registering misalignment information of image data corresponding to the image sensor, wherein the misalignment information is stored in a registry of the operating system of the computing device;
        receiving image data; and
        using the registered misalignment information, transforming the received image data to
            transformed image data, the transformed image data being aligned with an operating orientation of the computing device.

2. The method of claim 1, further comprising determining the misalignment information by querying a driver for the image sensor.

3. The method of claim 1, further comprising using the registered misalignment information to limit a number of memory format conversions of the image data to less than two memory format conversions.

4. The method of claim 1, wherein the misalignment information includes an indication that a native orientation of the image sensor is misaligned with an operating orientation of the computing device in any orientation.

5. The method of claim 1, wherein the misalignment information is stored in an operating system descriptor.

6. The method of claim 1, wherein the misalignment information is stored in a binary object store (BOS) descriptor of the operating system.

7. The method of claim 1, wherein the misalignment information comprises a misalignment rotation amount.

8. The method of claim 1, the computing device including a first computing component and a second computing component, wherein the first computing component uses a first memory format and a second computing component uses a second memory format, wherein the second computing component processes the image data and the first memory format and the second memory format are different, wherein the first memory format and the second memory formed are one of a central processing unit (CPU) memory format, a graphics processing unit (GPU) memory format, and a vision processing unit (VPU) memory format.

9. A method of transforming image misalignment, comprising:
    in an operating system of a computing device with an image sensor on the computing device that is misaligned relative to the computing device:
        receiving image data having a first orientation from the image sensor at a first computing component of the computing device;
        transforming the image data using misalignment information to transformed image data having a second orientation; and
        communicating the transformed image data from a final computing component of the computing device to an application, wherein the first computing component and the final computing component are one of a central processing unit (CPU), a graphics processing unit (GPU), or a vision processing unit (VPU).

10. The method of claim 9, wherein the first computing component and the final computing component are different.

11. The method of claim 9, wherein the first computing component uses a first memory format and a second computing component uses a second memory format, wherein the second computing component processes the image data and the first memory format and the second memory format are different, wherein the first memory format and the second memory format are one of a CPU memory format, a GPU memory format, and a VPU memory format.

12. The method of claim 9, wherein the method does not transform the image data using an image sensor driver for the image sensor.

13. The method of claim 9, further comprising:
    receiving a request from the application to modify a region of interest of the transformed image data;
    transforming the region of interest of the transformed image data from the second orientation to the first orientation; and
    modifying the region of interest of the image data to modified image data according to the request.

14. The method of claim 13, further comprising:
    transforming the modified image data from the first orientation to transformed modified image data in the second orientation; and
    communicating the transformed modified image data from the final computing component to the application.

15. The method of claim 9, further comprising collecting the image data using the image sensor, and wherein communicating the transformed image data occurs in real time relative to collecting the image data.

16. A method of transforming image misalignment, comprising:
in an operating system of a computing device with an image sensor on the computing device that is misaligned relative to the computing device:
receiving image data from the image sensor through the operating system; and
after receiving the image data and before any other processing of the image data, a first action on the received image data includes transforming the image data using misalignment information stored in the operating system, wherein a first computing component that processes the image data of the operating system requires a first memory format and an application requires a second memory format, wherein the first memory format and the second memory format are different.

17. The method of claim 16, further comprising:
identifying a region of interest to modify; and
before communicating the region of interest to the operating system, transforming the region of interest using the misalignment information.

18. The method of claim 16, wherein the method does not transform the image data using a driver for the image sensor.

19. The method of claim 16, wherein the image data is transformed before being displayed.

20. The method of claim 16, further comprising a second computing component, wherein the second computing component uses a third memory format, wherein the first memory format and the third memory format are different, wherein the first memory format and the third memory format are one of a central processing unit (CPU) memory format, a graphics processing unit (GPU) memory format, and a vision processing unit (VPU) memory format.

21. The method of claim 16, wherein the first memory format and the second memory format are different, wherein the first memory format and the second memory format are one of a central processing unit (CPU) memory format, a graphics processing unit (GPU) memory format, and a vision processing unit (VPU) memory format.

* * * * *